Oct. 30, 1962     J. S. ECKERT     3,060,503

SADDLES

Filed Feb. 25, 1959                               5 Sheets-Sheet 1

INVENTOR.
JOHN S. ECKERT
BY
ATTORNEY

Oct. 30, 1962    J. S. ECKERT    3,060,503
SADDLES
Filed Feb. 25, 1959    5 Sheets-Sheet 2

INVENTOR.
JOHN S. ECKERT
BY
ATTORNEY

Oct. 30, 1962 — J. S. ECKERT — 3,060,503
SADDLES
Filed Feb. 25, 1959 — 5 Sheets-Sheet 3
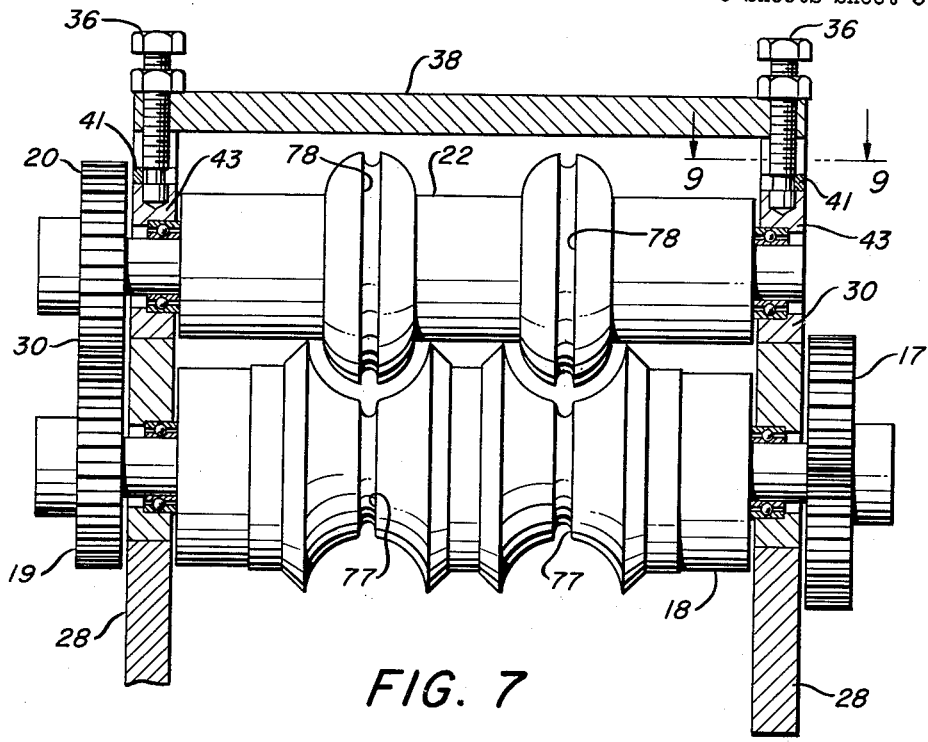
FIG. 7
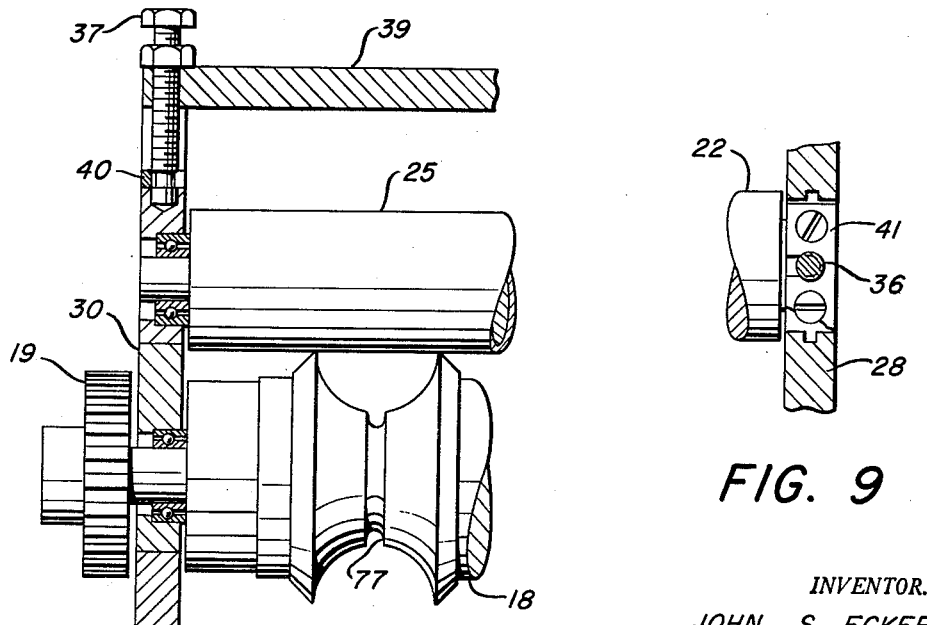
FIG. 8
FIG. 9
INVENTOR.
JOHN S. ECKERT
BY
ATTORNEY

INVENTOR.
JOHN S. ECKERT
BY
ATTORNEY

Oct. 30, 1962  J. S. ECKERT  3,060,503
SADDLES
Filed Feb. 25, 1959  5 Sheets-Sheet 5

INVENTOR.
JOHN S. ECKERT
BY
ATTORNEY

United States Patent Office 3,060,503
Patented Oct. 30, 1962

3,060,503
SADDLES
John S. Eckert, Silver Lake, Ohio, assignor to The United States Stoneware Company, Tallmadge, Ohio, a corporation of Ohio
Filed Feb. 25, 1959, Ser. No. 795,418
9 Claims. (Cl. 18—10)

This invention relates to saddles to be used in a treating tower for exposing a large surface of a liquid to a gas, the gas and liquid flowing countercurrent through the tower. The invention relates to the manufacture of the saddles and apparatus therefor.

Saddles have been previously used as packing in treatment towers. They are generally made of a stiff clay composition which is subsequently fired almost to the sintering point, but they can be made of any stiff plastic which can be rigidified after forming.

In making the saddles, the plastic is first extruded as a U-shaped ribbon, and this is pressed to shape, and the saddles are cut from it. There is preferably a lengthwise rib which projects from the middle of both surfaces of the extruded ribbon, and this rib is continued into the final product. It prevents the saddles from packing and also increases the edge area of the ribbon from which liquid is adapted to drip. The major portion of the transfer from a gas to a liquid, and vice versa, takes place in a tower during the transfer of the liquid from one packing element to another. Therefore, the larger the number of points of each individual saddle from which the liquid drips, the greater the efficiency of the tower.

The extruded ribbon is formed into the saddle by pressing it into the generally concave surface of a female forming roll by the generally convex surface of a male forming roll. In the improved apparatus, these two forming rolls have surfaces of revolution. The formed ribbon is held against the female forming roll and, if necessary, its edges are trimmed by a trim roll. Each saddle is cut from the end of the ribbon while on the female forming roll, and is ejected from the concavity of this roll in completed form, except for firing. The rolls are rotated intermittently by a Geneva driver and the saddles are cut and ejected from the female roll as it comes to a stop and starts up again.

Each forming roll is preferably provided with a groove around its center to form and accommodate beads on the extruded ribbon, but if the ribbon is smooth the roll surfaces will be smooth. The rolls are described as generally convex and concave, meaning that they may or may not be grooved or otherwise indented or embossed. The surface of the trim roll is preferably cylindrical.

The improved saddle which has scalloped edges and which is covered in pending application Serial No. 81,189 filed January 6, 1961, is advantageously formed by a trim roll having a corrugated surface interlocked with scallops on the edges of the female forming roll, as will be more particularly described in what follows.

The invention will be described in connection with the accompanying drawings which show duplicate rolls, etc. for forming two saddles at the same time from different ribbons of plastic. In the drawings—

FIG. 7 is a section through the two forming rolls on the line 7—7 of FIG. 1;

FIG. 8 is a section of the female forming roll and the trim roll on the line 8—8 of FIG. 1;

FIG. 9 is a detail on the line 9—9 of FIG. 7;

Figure 1:
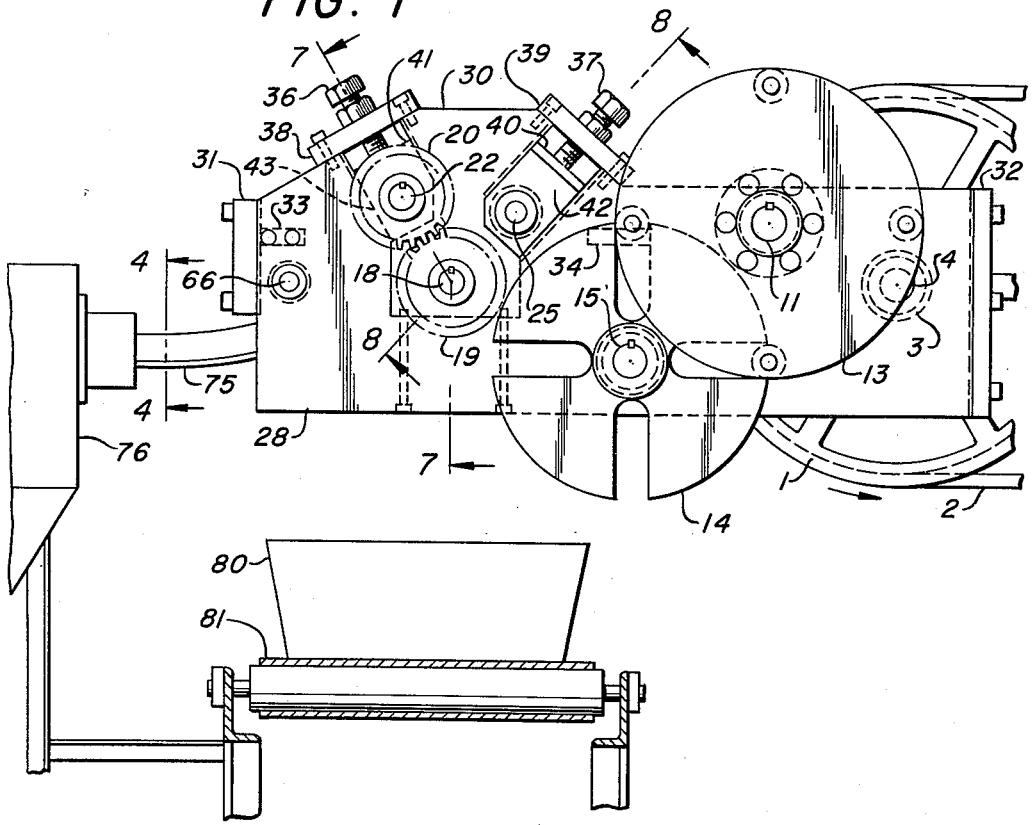
FIG. 1 is a side elevation of the saddle-forming equipment, showing a ribbon of plastic passing from an extruder to the forming rolls, etc.

The drive pulley 1 is driven counterclockwise by the belt 2 by a motor or other equipment not shown. The drive pulley and Geneva pinion 3 are keyed to the drive shaft 4. Also keyed to the shaft 4 are the cut-off cam assemblies 6 and the ejector cam assemblies 8.

Geneva pinion 3 drives the bull gear 10 mounted on Geneva driver shaft 11. Also mounted on shaft 11 is Geneva driver 13 which drives Geneva star 14 which is mounted on one end of Geneva star shaft 15. On the opposite end of the shaft 15 is the large gear 16 which meshes with the small gear 17 which is keyed to the female forming roll 18. At the opposite end of the female forming roll is the roll timing gear 19 which meshes with the roll timing gear 20 on the end of the male forming roll 22. The trim roll 25 rests on the flanges of the female forming roll 18 (FIG. 8) and is rotated by it in the opposite direction from the roll 18. The edges of the respective male and female forming rolls are aligned and they are spaced just far enough apart to form a saddle between them (FIG. 7). Because the gears 19 and 20 on the female and male forming rolls mesh with one another they are rotated in opposite directions. Being driven by the star wheel, their motion is intermittent, for a reason to be explained.

The gear ratios of the gears 3 and 10 and the gears 16 and 17 is such that the gear 17 rotates only half as fast as the gear 3. Thus the cams in the assemblies 6 and 8 make two revolutions for each revolution of the forming rolls. For the manufacture of small saddles, it is desirable to make the rolls of relatively larger diameter to prevent their bending, and the gear ratio will be changed in order to coordinate the various operations.

The various shafts and rolls are supported in the frame 28 in suitable bearings, etc., and, as best shown in FIG. 1, the two forming rolls and the trim roll are supported in a bearing block 30 in said frame. The side walls of the frame are held together at the front by the front frame plate 31 and at the back by the rear frame plate 32. The cross plates 33 and 34 space the side walls of the frame. As best shown in FIG. 1, the shafts extending from the ends of the male forming roll 22 and the trim roll 25 are supported in bearing blocks and positioned by adjusting screws 36 and 37 threaded into cross plates 38 and 39. The screws bear against retaining plates 40 and 41 adjacent the bearing blocks 42 and 43 which fit between the frame proper and the main bearing block 30.

A separate ribbon of plastic is fed between each two forming rolls. For each forming roll there is a knife 50 the cutting edge of which is generally circular. If there is a groove at the center of the female forming roll there is a projection at the centerline of the knife. Thus, the knife edge exactly fits the contour of the forming roll.

A knife for each forming roll is clamped to the cut-off knife holder 51 by the cut-off knife clamp 52. Connecting rods 54 connect the cut-off knife holder with the cut-off cam assemblies 6, each of which includes a cam and bearing. Thus on each revolution of the drive shaft 4 the knives are moved substantially radially into contact with the female forming rolls and then withdrawn from contact there with a sufficient distance to permit a ribbon of plastic to pass between each knife edge and forming-roll surface. The movement of the female forming roll ceases as the knife is brought into contact with it and cuts a completely formed saddle from the end of the plastic ribbon. Each saddle, as it is cut from the ribbon, is completely formed except for drying and firing.

Figure 5:
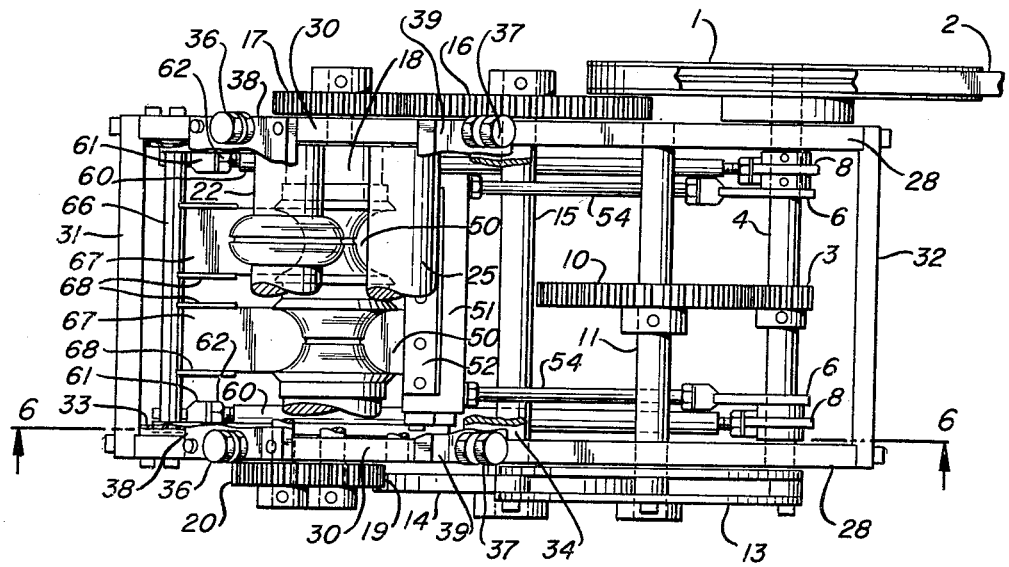
FIG. 5 is a plan view of the forming equipment.
Figure 6:
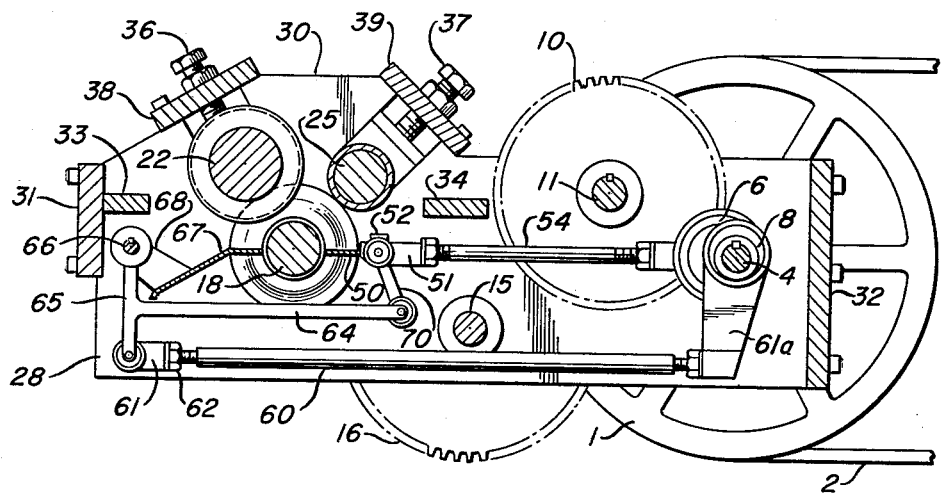
FIG. 6 is a sectional elevation of the forming equipment on the line 6—6 of FIG. 5.

The ejector is also operated from the drive shaft 4. One end of the ejector connecting rod 60 is held in the cross brace 61a which is suspended vertically from each ejector cam assembly 8. Each of these cam assemblies includes a cam and cam bearing. The other end of each connecting rod 60 is held in an ejector-rod end 61 by an ejector-rod nut 62. The ejector-cutter arm is T-shaped and comprises the elongated relatively horizontal stem portion 64 and the short relatively vertical cross arm 65. The ejector-rod end 61 is swivelly supported from the bottom of the cross arm 65, and the top of the cross arm 65 is swivelly supported from the ejector shaft 66. The ejector is made of a bent sheet-metal plate 67 the sides 68 of which are bent up and fastened to the ejector shaft 66 (FIG. 5). The free end of the horizontal ejector arm 64 is connected with the cut-off knife holder 51 by the ejector-cutter link 70. One end of this link is swivelly attached to the ejector-cutter arm 64 and the other end is swivelly connected to the cut-off knife holder 51.

Figure 2:
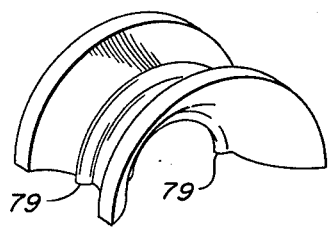
FIGS. 2 and 3 are different views in perspective of the finished saddle.
Figure 3:
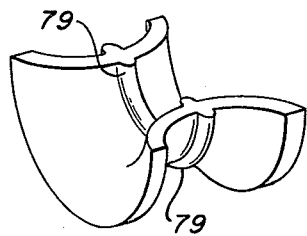
Figure 4:
FIG. 4 is a section through the extruded plastic ribbon on the line 4—4 of FIG. 1.
Figure 10:
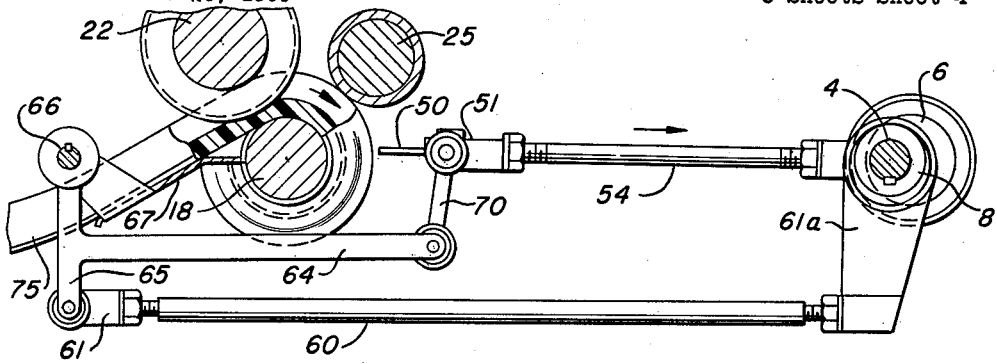
FIGS. 10, 11 and 12 show the cut-off and ejector mechanism in different positions in the operating cycle.
Figure 11:
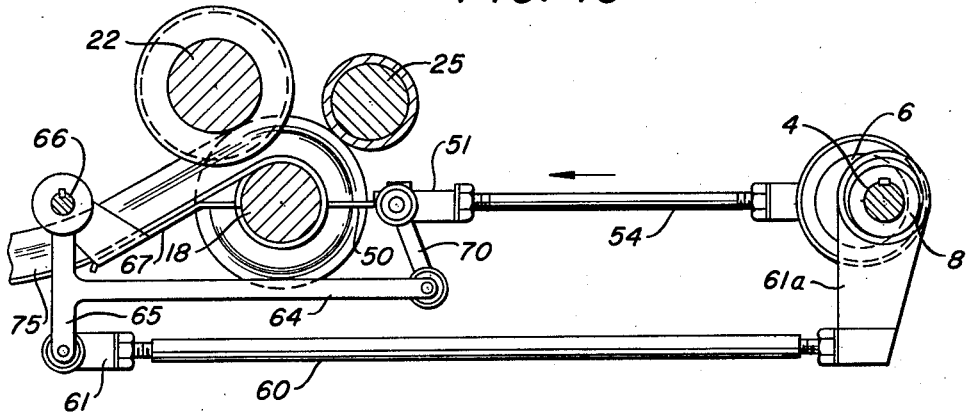
Figure 12:
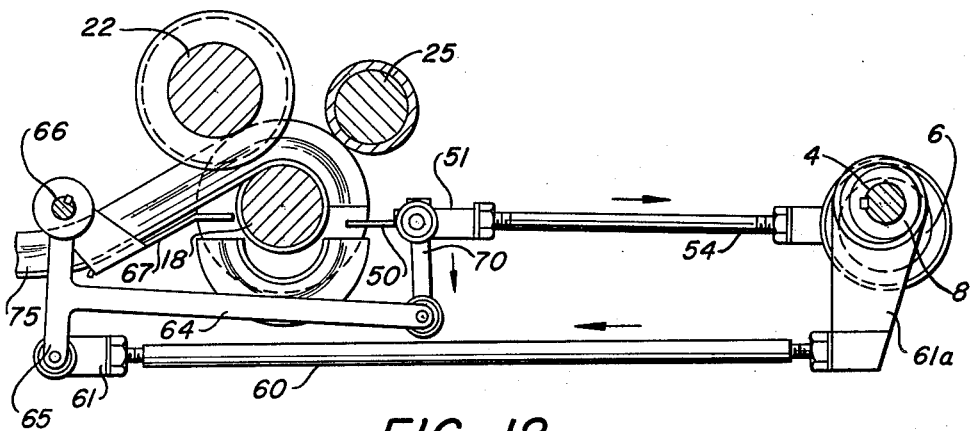

The operation of the cut-off knives and ejector is best explained in connection with FIGS. 10–12. The ribbon of plastic 75 is fed from the extruder 76 (FIG. 1) between the concave and the convex surfaces of the male and female forming rolls where it is pressed to shape. The grooves 77 and 78 at the centers of the forming rolls form the beads 79 (FIGS. 2 and 3) on the finished saddle. The ribbon adheres to the female roll and during the cutting of each saddle from the end of the ribbon and its separation from the female forming roll, the ribbon is held against this forming roll by the trim roll 25. The trim roll 25 also trims off any excess plastic from the ribbon just before each saddle is cut from it.

Each complete revolution of the Geneva driver 14 produces four 180-degree turns of the forming rolls. The cams of the cam assemblies 6 and 8 turn counter-clockwise and continuously. Both cams have rotated through 180 degrees in passing from the position shown in FIG. 10 to that shown in FIG. 11, and another 90 degrees in passing to the position shown in FIG. 12. Each time the knife 50 moves into contact with the surface of the female roll and severs a saddle from the ribbon of plastic, the forward end of this severed portion of the ribbon is in contact with the ejector. The knife is then withdrawn to the position shown in FIG. 10 by rotating the cam 6 through 180 degrees. With the knife away from the roll, the star driver makes a one-quarter turn and this rotates the forming rolls through 180 degrees, bringing the forward end of the ribbon of plastic against the ejector 67. As the knife approaches the forming roll 18 (FIG. 10) it is above its center and is moved toward it circumferentially and radially, with the circumferential speed of the knife matching that of the roll. The knife comes into full cut-off contact with the roll (FIG. 11) at the moment when the speed of the roll passes through zero. From this moment on the circumferential speed of the knife is greater than the speed of the roll as the knife is withdrawn radially. (FIGURE 12.) This accomplishes ejection on both the knife and ejector ends of the freshly cut saddle with a minimum of distortion. The action of the ejector is now explained.

The cross brace 61a hangs vertically at all times. As the cam 8 rotates, the cross brace is swung from one side to the other. In its extreme left position (FIG. 12), the ejector 67 is moved down so that it is no longer directed radially toward the forming roll 18, and in moving down it presses against the forward end of the saddle. This movement of the ejector-cutter arm, depresses the free end of arm 64, pulling the cut-off knife 50 away from the freshly cut end of the ribbon of plastic. This downward movement of both the ejector, pressing against one end of the newly formed saddle, and the knife moving in the same general direction and pressing against the other end of the saddle, separates the finished saddle from the forming roll 18. It falls into the sagger 80 which is carried away by the conveyor belt 81. During the operation the forward end of the ribbon is held against the forming roll 18 by the trim roll 25 so that when rotation of the forming roll is resumed the ribbon of plastic moves with it and is positioned with its forward end against the ejector (as in FIG. 10), ready for severance of another saddle from the plastic ribbon by the described reciprocating motion of the knife.

As the ejector-cutter link 70 swings to the right, the knife is moved away from the roll 18, as described, and as the roll makes another half turn the cut end of the plastic which adheres to the forming roll comes into contact with the ejector and when the rotation of the forming roll again ceases momentarily, the knife is pushed through the plastic into contact with roll 18. The movement of the ejector is a pivotal down and up movement, and the knife while retained in a substantially horizontal position executes a somewhat ovate movement.

Figure 13:
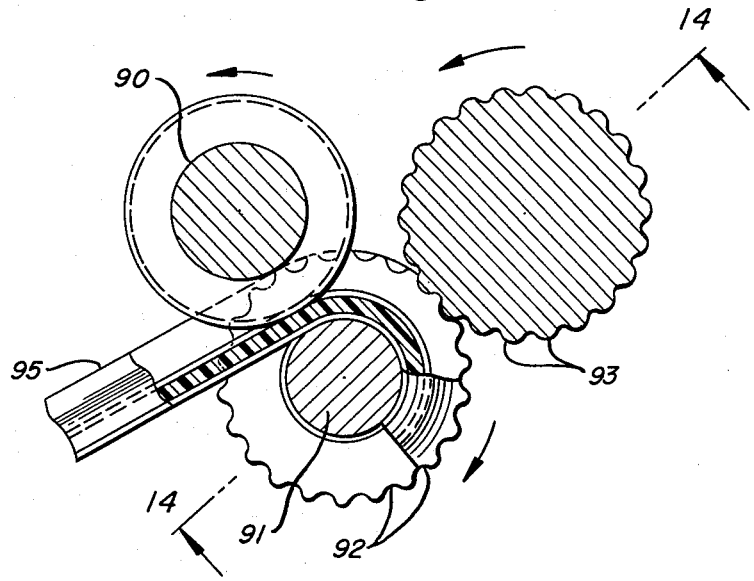
FIG. 13 is a detail in section through the rolls used for forming the saddle with the scalloped edges.
Figure 15:
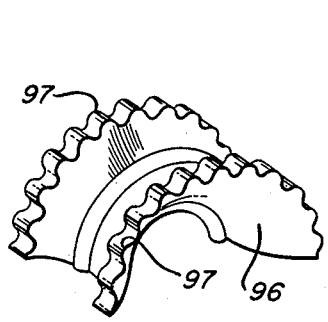
FIG. 15 is a view in perspective of the saddle with the scalloped edges covered in the copending application cited above.
Figure 14:
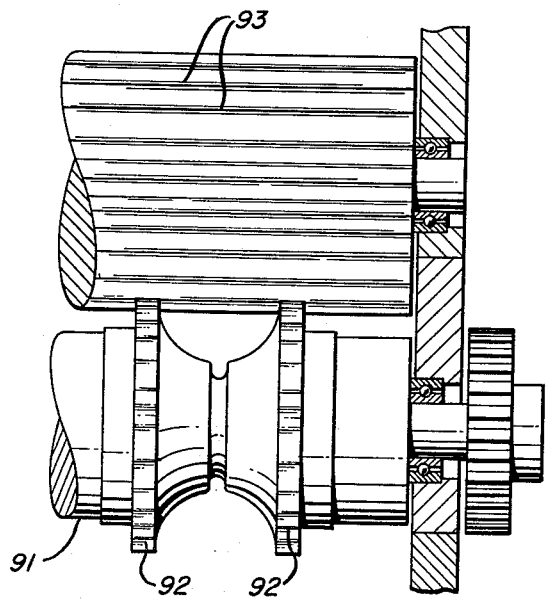
FIG. 14 is an elevational view of the trim roll and female forming roll on the line 14—14 of FIG. 13.

The operation of the mechanism for making saddles with scalloped edges is the same, the only difference being that the surface of the trim roll is corrugated and interlocked with the scalloped edges of the female forming roll. This is illustrated in FIGS. 13 and 14, and FIG. 15 shows a saddle the curved edges of which are scalloped.

The same male forming roll 90 is used for making scalloped saddles. The female roll 91 is the same as roll 18 except that the edges are scalloped at 92. The surface of the trim roll is corrugated at 93 and the corrugations are interlocked with the scallops 92. This interlocking confines the ribbon of plastic 95 within the confines of the convex and concave surfaces of the rolls 90 and 91, and the curved edges of the saddle 96 (FIG. 15) are scalloped at 97. These scallops are spaced about ⅛ to ¼ inch from center to center. They are made as pointed as is feasible. The liquid drips from these, greatly increasing the number of interstitial transfer points of the liquid in a tower.

Modifications can be made in the equipment shown, as will be suggested to the man skilled in the art. The ratio of the length to the width of the saddles may vary. The major dimension may be varied from about ⅜ to 2½ inches, more or less. Whether or not the edges of the saddle are scalloped, the surfaces of the forming rolls may be corrugated to increase the number of transfer points on the saddles.

The invention is covered in the claims which follow.

What I claim is:

1. In apparatus for the molding of saddles, the combination of a male forming roll with a generally convex surface and a female forming roll with a generally concave surface, said generally convex and concave forming surfaces being surfaces of rotation and the smallest space between said surfaces being just sufficient to form a saddle between them, the female roll including two cutting edges which encircle it, one of said cutting edges being located on each side of the concave forming surface of the female roll, and a trim roll of uniform cross section which rests on said cutting edges and is adapted to trim the edges of the saddles formed between the said forming rolls without contacting any portion of the saddle between its edges.

2. The apparatus of claim 1 in which there is at least one groove encircling the forming rolls.

3. The apparatus of claim 1 in which there is one groove encircling the center of both forming rolls.

4. In apparatus for the molding of saddles, the combination of a male-forming roll with a generally convex surface and a female-forming roll with a generally concave surface, both rolls having surfaces of rotation and the smallest space between said surfaces being just sufficient to form a saddle between them, the sides of the female roll extending outwardly only a sufficient distance to mold the saddle, and a trim roll in contact with the edges of said sides of the female roll to form the edges of the finished saddle, with means for rotating the female and male forming rolls intermittently in opposite directions, together with a cut-off knife and ejector, and means for reciprocating the edge of the knife toward and away from the surface of the female roll and contacting it while it is not in motion, and for moving the knife and ejector simultaneously away from the roll in the same general direction to separate a completed saddle from the roll.

5. In apparatus for the molding of saddles, the combination of a a male-forming roll with a generally convex surface and a female-forming roll with a generally concave surface, both rolls having surfaces of rotation and the smallest space between said surfaces being just sufficient to form a saddle between them, the sides of the female roll extending outwardly only a sufficient distance to mold the saddle, and a trim roll in contact with the edges of said sides of the female roll to form the edges of the finished saddle, the surface of the trim roll being corrugated, and the edges of the sides of the female roll are scalloped and interlocked with the corrugations of the trim roll.

6. In apparatus for the molding of saddles, the combination of a a male-forming roll with a generally convex surface and a female-forming roll with a generally concave surface, both rolls having surfaces of rotation and the smallest space between said surfaces being just sufficient to form a saddle between them, the sides of the female roll extending outwardly only a sufficient distance to mold the saddle, and a trim roll in contact with the edges of said sides of the female roll to form the edges of the finished saddle, a Geneva star combination with the male and female forming rolls and the trim roll for imparting intermittent motion thereto, and a drive shaft with cut-off knife cam assemblies and ejector cam assemblies fastened thereto with means for rotating the same continuously, a cut-off knife with means connected with said cut-off knife assembly for reciprocating the edge of the knife into and out of contact with the surface of the female forming roll while it is not in motion and for moving the edge of the knife and the surface of the roll at the same speed prior to their being brought into contact and for moving the knife faster than the surface of the roll after said contact, an ejector pivotally supported with its effective edge adjacent the surface of the female forming roll diametrically opposite from the knife edge when it is in contact with said roll, with means operated by said ejector cam assembly for pivoting the ejector whereby the edge adjacent the surface of the female forming roll is moved away from the roll, and means operated by the ejector cam assembly pivotally connected with the knife for imparting a generally ovate motion to the knife whereby in their movement from the contact roll the edge of the knife and the edge of the ejector are moved in the same general direction away from said roll and separate the finished saddle from the female forming roll.

7. The method of forming saddles which comprises forming a U-shaped ribbon of plastic and holding it against the concave periphery of a roll, cutting off the end of the ribbon while on the roll and then separating it from the roll by simultaneously moving both ends of the cut-off end of plastic away from the roll.

8. The process of claim 7 in which the roll is rotated intermittently and the end of the ribbon is finally cut off while the roll is not in motion.

9. The method of making a saddle from a U-shaped ribbon of plastic which comprises completing the formation of the saddle except for its edges by passing said ribbon between two forming rolls which have, respectively, concave and convex surfaces of rotation while rotating said rolls in opposite directions, and then scalloping the edges of the saddle while it is supported on said forming roll with a concave surface by pressure contact of each edge with a cylindrical corrugated surface while rotating said cylindrical surface in the direction opposite to that of said roll with a concave surface.

References Cited in the file of this patent

UNITED STATES PATENTS

| | | |
|---|---|---|
| 50,288 | Tittle | Oct. 3, 1865 |
| 329,877 | Baxter | Nov. 10, 1885 |
| 338,800 | Strange | Mar. 30, 1886 |
| 459,817 | McHugh | Sept. 22, 1891 |
| 1,796,501 | Berl | Mar. 17, 1931 |
| 2,199,660 | Eichhorn | May 7, 1940 |
| 2,380,230 | Gatke | July 10, 1945 |
| 2,602,651 | Cannon | July 8, 1952 |
| 2,639,909 | Leva | May 26, 1953 |
| 2,734,245 | Chamberlain | Feb. 14, 1956 |

FOREIGN PATENTS

| | | |
|---|---|---|
| 768,316 | Great Britain | Feb. 13, 1957 |

UNITED STATES PATENT OFFICE
CERTIFICATE OF CORRECTION

Patent No. 3,060,503              October 30, 1962

John S. Eckert

It is hereby certified that error appears in the above numbered patent requiring correction and that the said Letters Patent should read as corrected below.

Column 5, line 25, for "are" read -- being --.

Signed and sealed this 26th day of March 1963.

(SEAL)
Attest:
ESTON G. JOHNSON

Attesting Officer

DAVID L. LADD
Commissioner of Patents